United States Patent
Lu et al.

(10) Patent No.: US 9,805,252 B2
(45) Date of Patent: Oct. 31, 2017

(54) VIDEO BASED FACIAL RECOGNITION FOR CUSTOMER VERIFICATION AT TOUCHLESS CHECKOUT

(71) Applicant: Toshiba Tec Kabushiki Kaisha, Tokyo (JP)

(72) Inventors: Shiyang Lu, Marsfield (AU); Chaminda Weerasinghe, Bella Vista (AU)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 298 days.

(21) Appl. No.: 14/714,055

(22) Filed: May 15, 2015

(65) Prior Publication Data

US 2016/0335480 A1 Nov. 17, 2016

(51) Int. Cl.
*G06K 9/00* (2006.01)
*G06Q 20/20* (2012.01)
*G06T 17/00* (2006.01)
*H04N 13/02* (2006.01)

(52) U.S. Cl.
CPC ..... *G06K 9/00255* (2013.01); *G06K 9/00228* (2013.01); *G06K 9/00288* (2013.01); *G06Q 20/206* (2013.01); *G06T 17/00* (2013.01); *G06T 2210/56* (2013.01); *H04N 13/0207* (2013.01); *H04N 13/0275* (2013.01)

(58) Field of Classification Search
None
See application file for complete search history.

(56) References Cited

U.S. PATENT DOCUMENTS

| | | | | |
|---|---|---|---|---|
| 5,982,912 | A * | 11/1999 | Fukui | G06K 9/00221 382/115 |
| 6,522,772 | B1 * | 2/2003 | Morrison | G06Q 20/208 235/383 |
| 2006/0017804 | A1 * | 1/2006 | Lee | G06K 9/00228 348/14.01 |
| 2013/0246270 | A1 * | 9/2013 | Du | G06K 9/00288 705/44 |
| 2014/0114643 | A1 * | 4/2014 | Baker | G06F 17/30817 704/9 |
| 2015/0235416 | A1 * | 8/2015 | Coon | G06T 17/20 345/423 |
| 2016/0070952 | A1 * | 3/2016 | Kim | G06K 9/00208 382/118 |

(Continued)

*Primary Examiner* — Sumati Lefkowitz
*Assistant Examiner* — David Perlman
(74) *Attorney, Agent, or Firm* — SoCal IP Law Group LLP; Jonathan Pearce; Steven C. Sereboff

(57) ABSTRACT

Facial recognition method comprises generating an average three-dimensional model from a series of two-dimensional, consecutive, captured video frames and rotating that three-dimensional model to a frontal view. The three-dimensional model may be reduced to a two-dimensional model in order to create a mean reference map. Next, the method includes accessing a facial database to compare the mean reference map to a series of previously-stored reference maps, one for each individual in the database, each of the previously-stored reference maps including a set of previously-stored reference points. Finally, an individual whose previously-stored reference map most closely matches the mean reference map is identified as a match.

10 Claims, 14 Drawing Sheets

(56) References Cited

U.S. PATENT DOCUMENTS

2016/0163029 A1* 6/2016 Gibbon .............. G06K 9/00221
                                                         382/190
2016/0267319 A1* 9/2016 Murillo .............. G06K 9/00255

* cited by examiner

VIDEO BASED FACIAL RECOGNITION FOR CUSTOMER VERIFICATION AT TOUCHLESS CHECKOUT

BACKGROUND

Field

This disclosure relates to facial recognition and, more particularly, to improvements in correctly identifying individuals based upon captured frames of video.

Description of the Related Art

Typical facial recognition systems compare stored data derived from a single frontal image with data derived from another stored or real-time frontal image. This introduces problems when the frontal image being compared to the stored data is not exactly square with the camera is partially in-frame, or presents a view that has atypical shading due to lighting conditions.

These comparisons are typically performed on a one-to-one basis. Either a face is a match or it is not. Finally, typical facial recognition systems used in authentication systems or customer checkout systems often provide no guidance to a prospective user to aid them in providing a "good" quality image for use by the system in performing facial recognition. As a result, facial images are often of too low a quality (either distant or partially obscured) to be useful to such a system.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

The present system solves the foregoing problems by including real-time feedback to ensure that prospective users are guided to provide quality facial images to the system for comparison to stored facial data. Further, the present system utilizes multiple frames of video in order to derive a relatively high confidence of a given user's identity rather than relying upon a single frame.

Further, the present system constructs three-dimensional model of a prospective user's face from multiple angles, using the multiple frames of video, then algorithmically rotates the three-dimensional model to a frontal view. Thereafter, data derived from the series of frontal views can be averaged for comparison to a base set of facial data in order to determine if the data matches.

The system and these processes drastically increase the accuracy of correct facial recognition by eliminating the inordinate reliance upon a single image, ensuring that the frames of video provided by a prospective user are of adequate quality, and by confirming the facial recognition results over multiple frames of video.

Description of Apparatus

Figure 1:
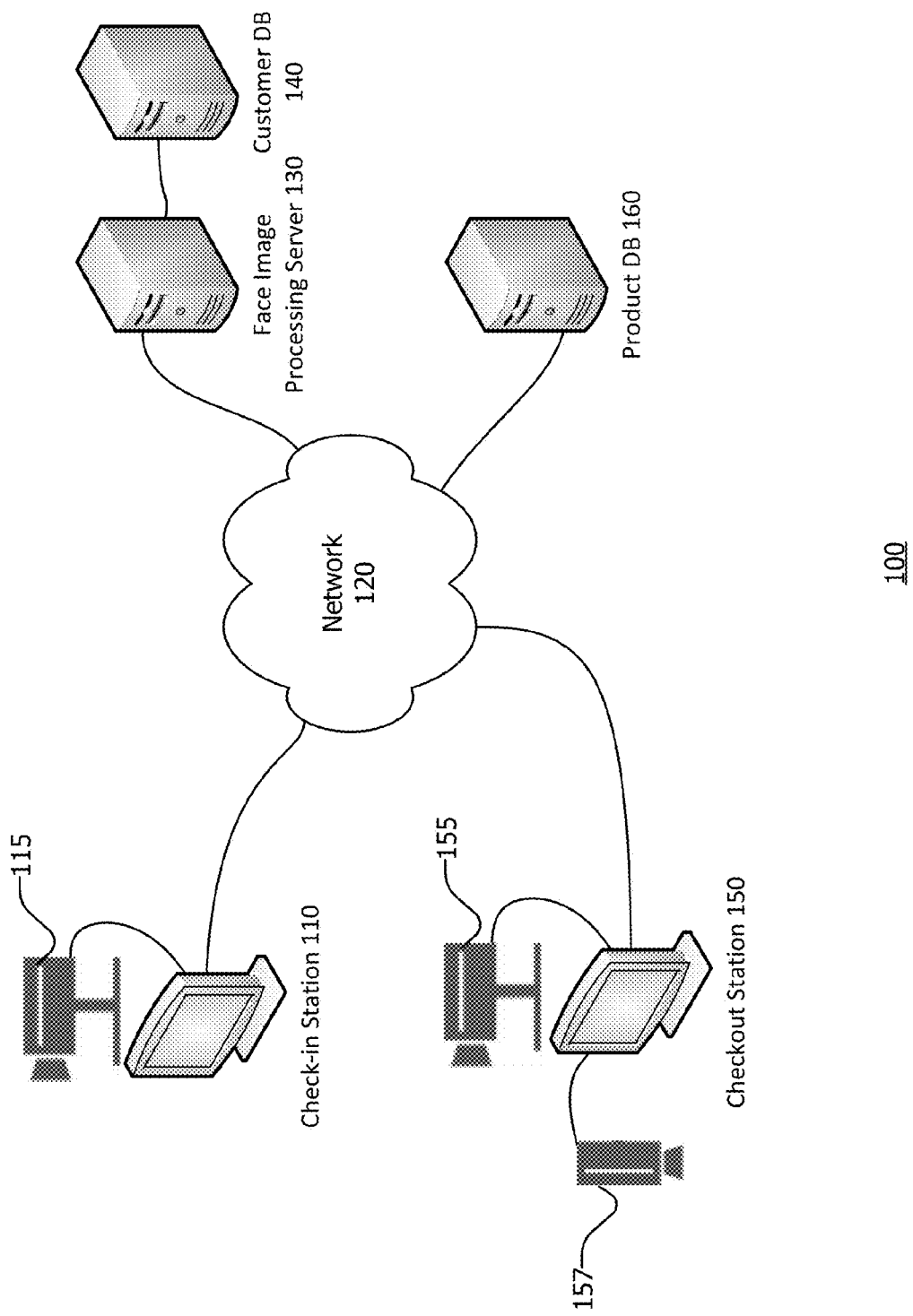
FIG. 1 is a diagram of a facial recognition system.

Referring now to FIG. 1, is a diagram of a facial recognition system 100 including a check-in station 110, with a camera 115, a face image processing server 130, a customer database 140, a checkout station 150, including two cameras 155 and 157, and a product database 160 all connected by a network 120 as shown. A system 100 may include more than one check-in station 110 or checkout station 150. Depending on the specific implementation, other elements of the overall system 100 may also be duplicated.

The check-in station 110 may be configured to enable a new user to be added to the facial recognition system 100. In particular, the camera 115 of the check-in station may be used to create one or more still photographs of an individual. These photographs may be used to generate a reference map of the individual's face made up of a series of reference points for storage on the customer database 140 (discussed below).

The check-in station 110 may be or be in-part a computing device (see FIG. 3) or may be a thin client with network connectivity to a server, such as the face image processing server 130. The check-in station 110 includes a display screen that is suitable to show an operator and/or individual the images being captured by the camera 115 for use in the facial recognition system 100. The check-in station may generate a reference map itself or may pass one or more full images on to the face image processing server 130 for generation of a reference map.

The check-in station 110 may be a facial recognition system used to gather image data and/or reference map data for later use in performing facial recognition.

As used herein, a reference map is a representation of a face made up of a series of reference points. For each individual face, a reference map is typically sufficiently different from a reference map of any other individual's face to perform facial recognition using only the reference points making up the reference map. Although types of reference maps vary, typical reference maps utilize fourteen reference points: three points for each eye (each corner and one on the iris); one for each eyebrow at the point closest to the center of the face; three points for the nose (one at the bridge, and one at each nostril); and three for the mouth (one at each corner, and one at the middle of both lips). Each individual face reference point is represented by its two-dimensional coordinates in the image associated with image features vectors. The associated image features may be the local features (e.g., Histogram of Gradients (HoG), Local Binary Patterns (LBP), Scale Invariant Feature Transform (SIFT), and similar features) extracted from the surrounding pixels of face reference points or the hybrid features which are the combinations of local features and global features (e.g., color histogram, holistic texture measurement, and so on). The extracted image feature vectors may be varied in different implementations.

The network 120 may be or include a local area network, a wide area network, a personal area network, a mobile or telephone network, the Internet, an intranet, or any combination of these. The network 120 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

Figure 3:
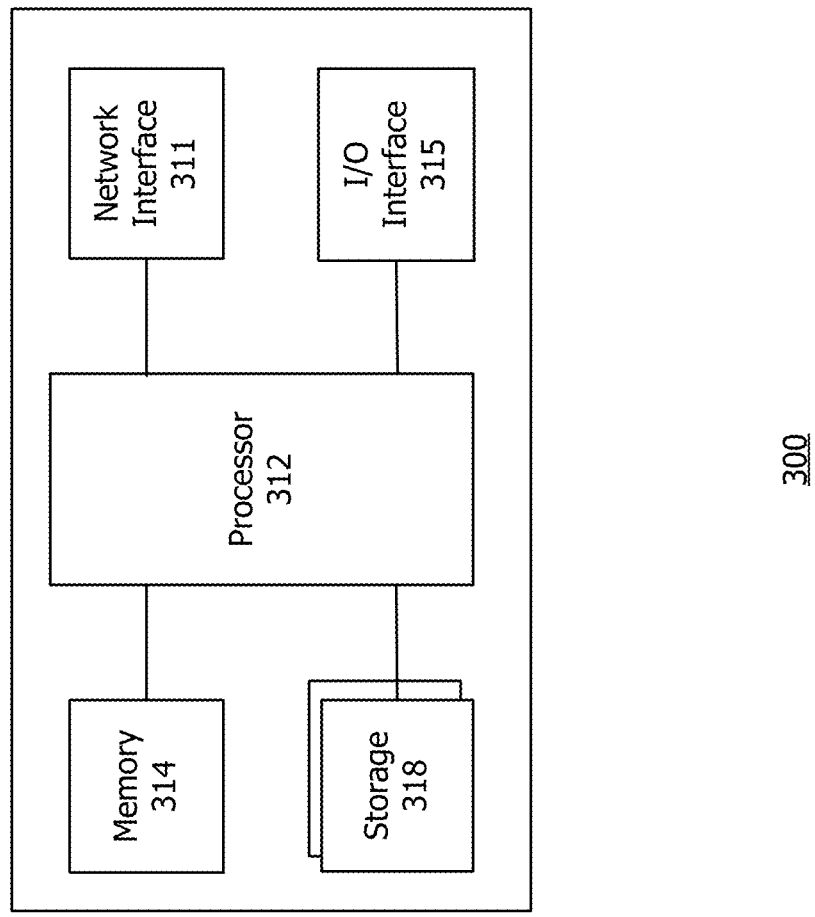
FIG. 3 is a block diagram of a computing device.

The face image processing server 130 is a computing device (as shown in FIG. 3) that utilizes the network 120 to receive image data and/or a reference map from the check-in station 110 in order to register new individuals with the system 100. The face image processing server 130 includes software that may generate a reference map from received image data. Any generated reference maps may then stored within a facial database within the face image processing server and/or within the customer database 140.

The face image processing server 130 also performs facial image recognition using its access to stored facial data when requested by, for example, the checkout station 150. To do so, the face image processing server 130 may receive image data for an individual for whom facial recognition is requested. If image data is received, the face image processing server 130 includes software suitable to generate a reference map from the received image data. If a reference map is received, or once one is generated, the face image processing server 130 may act to compare the received reference map for which facial recognition is requested with a database of stored facial recognition data in order to derive a suitable match. The face image processing server 130 may then return, using the network, an individual most likely to be the individual for whom facial recognition was requested based upon the image data or reference map provided and the available database of reference maps.

The customer database 140 may be a separate database system, using software operating on a computing device (see FIG. 3), that stores a customer identification number or other identifier as well as customer data such as a customer profile, history of past purchases, credit cards or other payment information associated with a customer, and any affiliation with a loyalty program. In the context of a supermarket customer, for example, this database 140 may be data typically associated in the U.S. with a customer loyalty discount card.

To maintain the privacy of the individual, the reference maps in the face image processing server 130 may intentionally be maintained separately from the customer database 140. Still further alternatively, the facial image processing server 130 may operate to perform facial recognition for a plurality of customers of the operator of the face image processing server 130 who may or may not be related to one another. Thus, a separate customer database 140 to which the face image processing server 130 has access may be maintained for purposes of identifying a customer upon request. Depending on the implementation, reference maps for individual faces may be stored in the customer database 140 as well.

Checkout station 150 typically includes a display in order to provide feedback regarding the status of facial recognition. The display may also provide information related to a checkout or authentication process such as confirmation of success, feedback regarding the process, indication of failure, indication of associated costs or loyalty programs and discounts.

The checkout station 150 includes two cameras 155, 157. Camera 155 may be used to generate a series of video frames of a customer. As they are created, the display may be used to provide visual feedback to a user to facilitate quality images being created for use in facial recognition. Camera 157 may be used to identify products or to take an image of products being purchased.

Though two cameras are shown, in some cases camera 157 may instead be another type of sensor such as an RFID (radio frequency identification) sensor, near field communication wireless sensor, Bluetooth® sensor, bar code scanner or other similar sensor. The checkout station 150 may be a computing device (see FIG. 3) or may be a thin client in communication with the face image processing server 130. The checkout system 150 may request facial recognition from the face image processing server 130 by providing image data in the form of multiple frames of video data or may provide a series of reference maps ready-made for evaluation by the face image processing server 130.

The checkout station 150 may be or have access to a point of sale (POS) system that includes software for performing typical POS functions such as checkout, identifying particular items, accessing a product database 160 for product prices and inventory maintenance, generating a tax calculation, accepting payment, and processing payment, either directly or by accessing a payment system.

The checkout station 150 may merely be a facial recognition system used to gather image data and/or reference map data for use in performing facial recognition and may not perform any "checkout" function. It may, for example, be an authentication to gain access to a printing device, to access a secure area of a building or to confirm membership within a group or ownership of an account. The product database 160 may be accessed by the checkout station 150 in order to obtain pricing and inventory information related to the products being purchased. The product database 160 may be maintained by the owners of the product, for example a supermarket, in order to maintain consistency of product prices and to automate inventory maintenance. In facial recognition systems without a "checkout" process, the product database may identify users by authentication cards or aid in inventory management of other systems such as printing systems.

Figure 2:
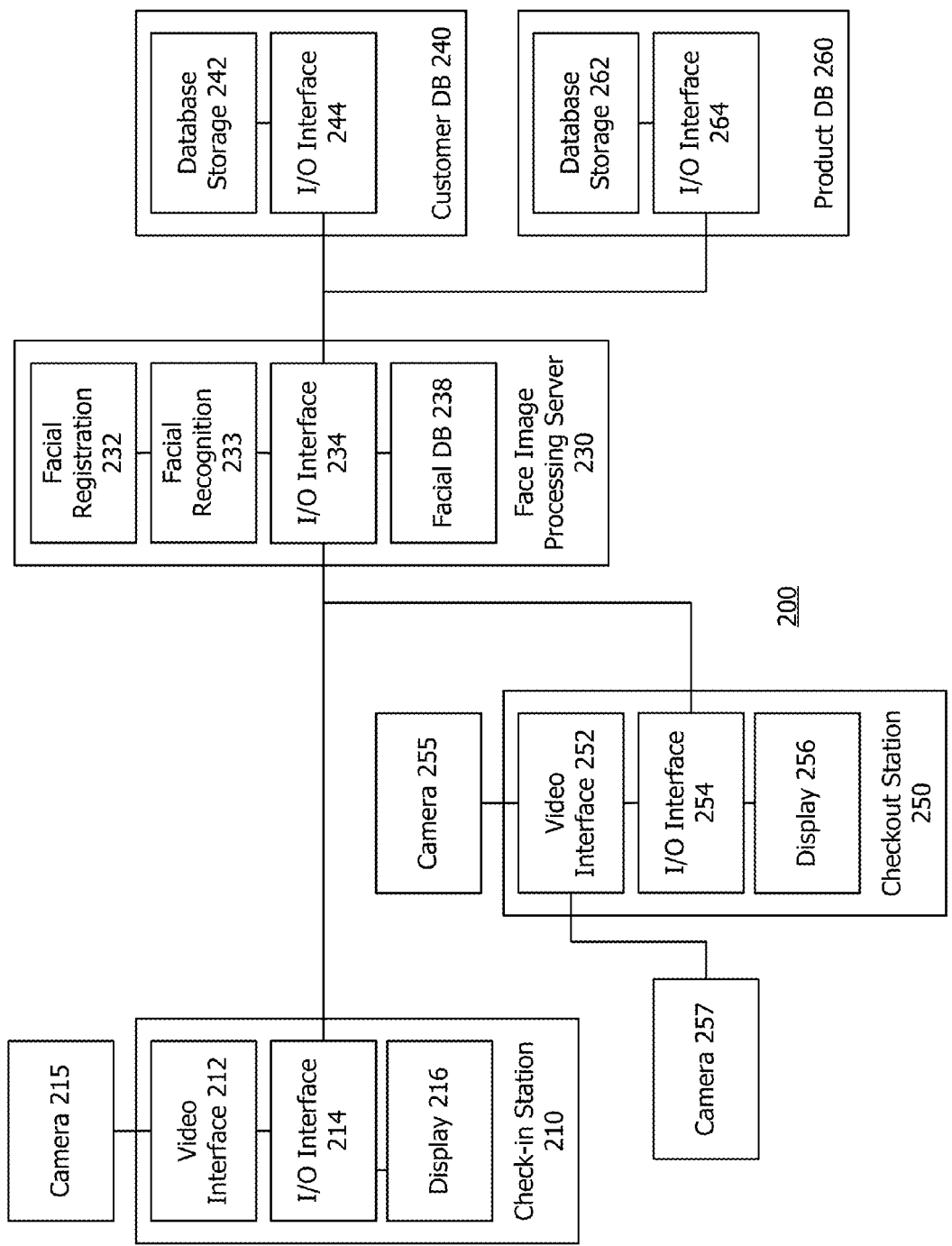
FIG. 2 is a block diagram of a software system for facial recognition.

FIG. 2 is a block diagram of a software system 200 for facial recognition. The same check-in station 210, camera 215, face image processing server 230, customer database 240, checkout station 250, cameras 255 and 257, and product database 260 as in FIG. 1 are shown. However, this diagram is a software system 200.

The check-in station 210 is shown with a video interface 212 for interfacing with video data provided by the camera 215. An I/O (input/output) interface 214 is also shown for use in communicating with other aspects of the present system via the network 120 (FIG. 1). Display software 216 is also available for use in displaying data on a display, including image data captured by the camera 215 to users of the check-in station 210.

In the example of FIG. 2, the check-in station 210 does not include facial recognition or registration software. Thus, in this system, the face image processing server 230 provides those functions. In other systems, portions of this process, such as facial registration, may take place on the check-in station 210.

The face image processing server 230 includes facial registration 232 software that is capable of accepting digital image data from the check-in station 210 and generating a reference map from that data. The image data itself may also be saved in some cases. The facial recognition software 233 is capable of accepting a reference map or digital image data and generating a reference map. The facial recognition software 233 is further capable of accessing the facial database 238 in order to compare the newly-generated reference map with previously-registered facial data in order to perform facial recognition.

The facial database 238 stores reference maps for each individual registered with the facial recognition system 200, typically registered using the facial registration 232 software. The facial database 238 may store reference maps in association with a unique individual identifier and may also store image data for that individual.

The I/O interface 234 enables the face image processing server 230 to communicate with the other elements of this system 200.

The customer database 240, as discussed above, includes database storage 242 software and associated hardware that is used to store customer data. The I/O interface 244 facilitates communication with the rest of the system 200.

The checkout station 250 includes video interface 252 software that enables the checkout station 250 to communicate with the camera 255 and camera 257. In cases in which camera 257 is a different type of sensor, the video interface 252 enables interaction with that sensor. The I/O interface 254 enables communication with the rest of the system 200 while the display 256 software may be used to display images of the individual attempting to perform facial recognition in addition to other data and prompts which may also be shown using a display.

The product database 260, as discussed above, includes database storage 262 software and associated hardware that is used to store product data. The I/O interface 264 facilitates communication with the rest of the system 200.

Turning now to FIG. 3, a block diagram of a computing device is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 may be configured to interface to a network such as network 122 (FIG. 1).

The I/O interface 315 may be configured to interface the processor 312 to peripherals (not shown) such as displays, keyboards and USB devices.

Description of Processes

Figure 4:
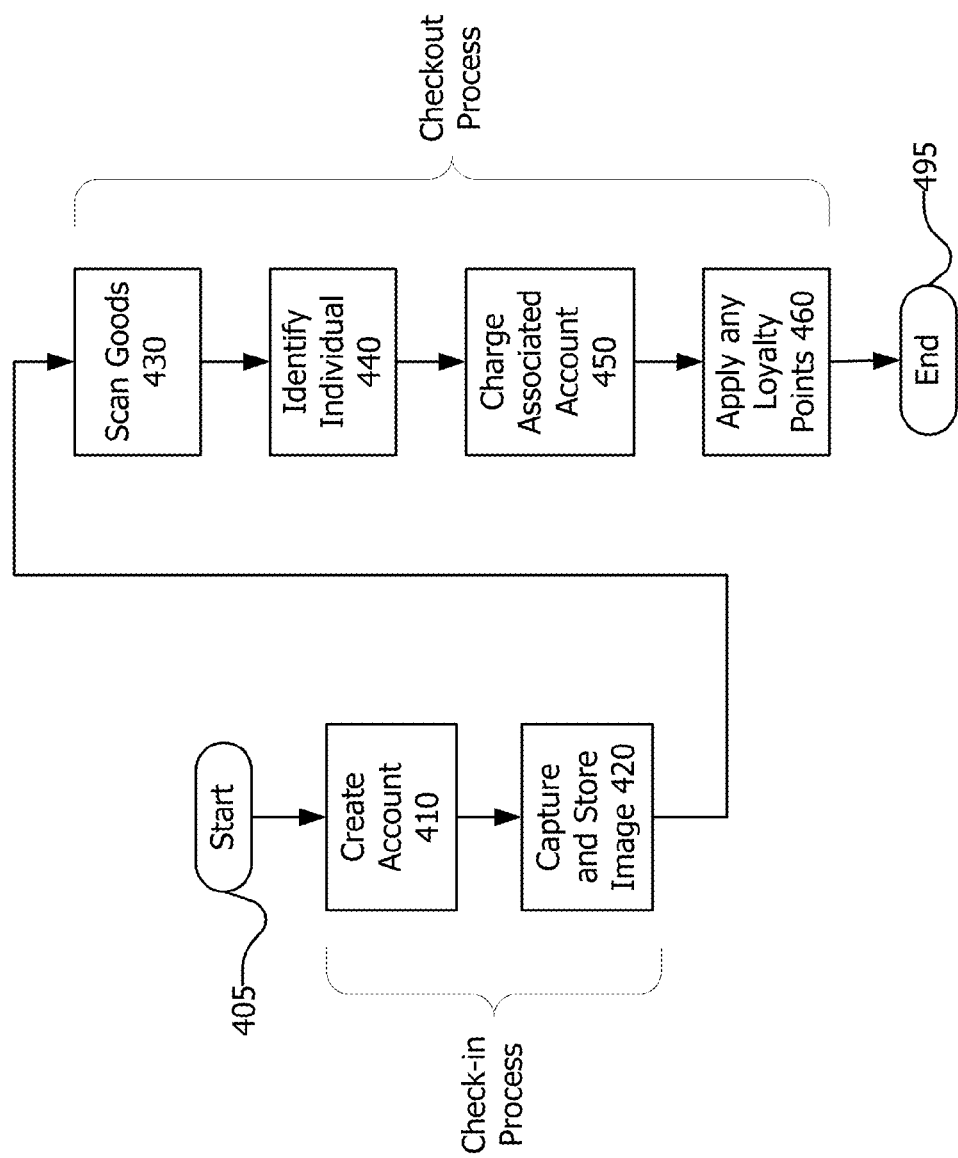
FIG. 4 is a flowchart of a facial recognition check-in and checkout process.

FIG. 4 is a flowchart of a facial recognition check-in and checkout process. The process begins at start 405 and continues to end 495. However, the process may not all take place in a short time frame and many instances of the process may be taking place simultaneously for different individuals. The process or a part of the process may iterate many times.

After the start 405, an individual may create an account 410. This process may be facilitated in a store or kiosk by an account specialist. In this way, the individual's identity may be confirmed as the account and facial recognition data is captured. Alternatively, this process may take place at home at a local computer or when an individual first desires to enter a location. The account creation process may involve creating an identity, generating a customer number or individual identification number, associating payment accounts or account permissions, associating existing loyalty accounts (in the case of shopping accounts) and other, similar processes.

However, as a part of this account creation process, the system 200 may be used to capture and store image data at 420. As a part of the capture and storage of image data at 420, the system 200 may perform facial registration using the facial registration 232 software (FIG. 2). This facial registration may generate one or more reference maps from one or more images taken during the capture and storage of image data at 420. This or these reference map(s) may be stored in the facial database 238 (FIG. 2) for use in performing facial recognition later.

Next, as a part of a checkout process, goods may be scanned at 430. This process may use more typical bar code scanning, RFID scanning, or visual perception of products selected and in a checkout area. The scanning of goods at 430 further may include accessing a product database, like database storage 262 in the product database 260 (FIG. 2), to ascertain prices and to update inventory information related to those products once checkout is complete.

Next, at 440, the individual may be identified. This process may involve using one or more cameras to capture video data including a series of frames of video of the customer. These frames may be provided to the facial recognition 233 software of the face image processing server 230 for use in performing facial recognition. Reference maps may be generated and compared with data in the facial database 238 (FIG. 2) to identify the customer.

Once the customer is identified, an account associated in the database storage 242 of the customer database 240 (FIG. 2) may be charged at 450 using charge data associated with the customer in the database 240. Any loyalty points may be added or applied at 460, also to the database 240.

Figure 5:
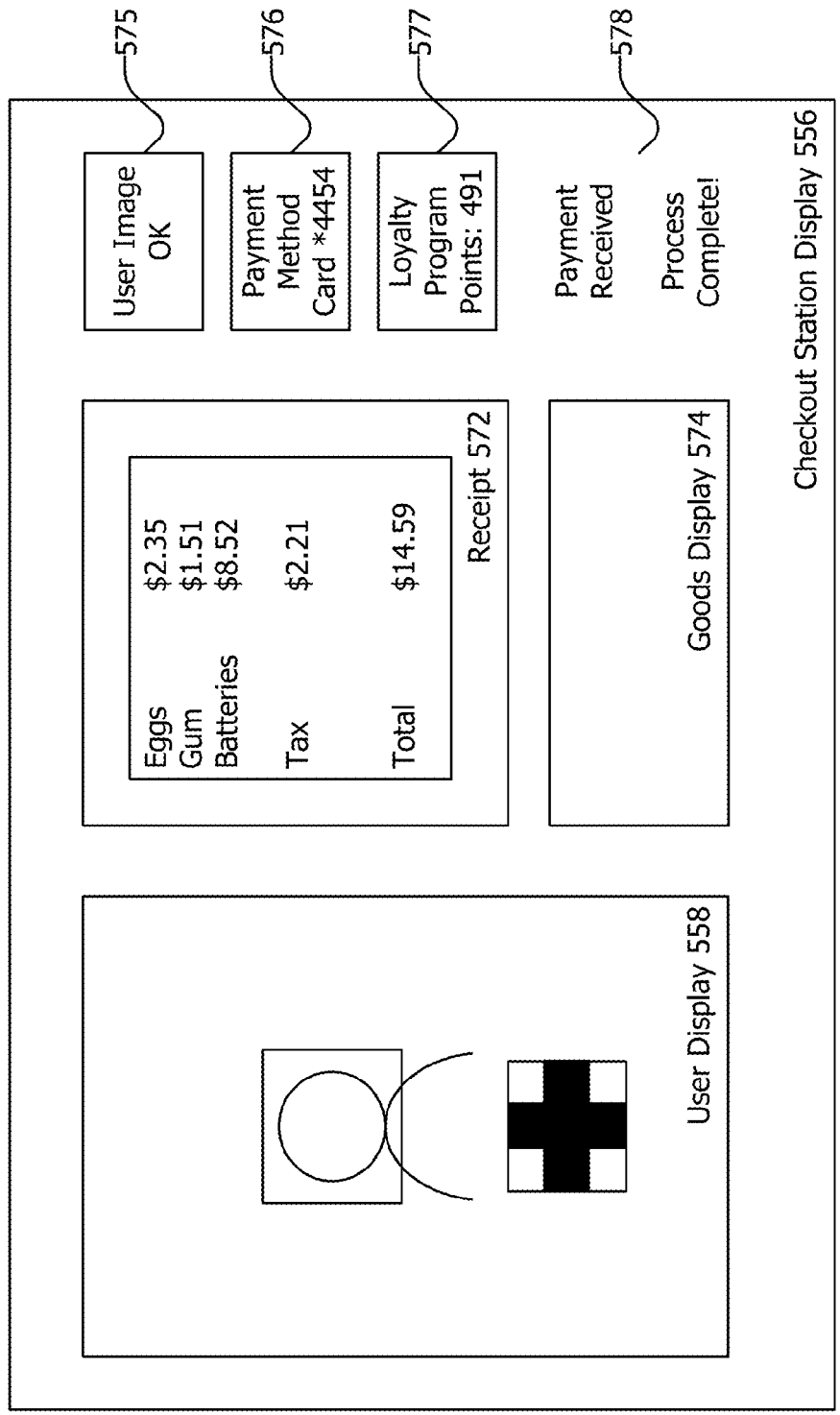
FIG. 5 is an example display from a facial recognition checkout system.

FIG. 5 is an example display 556 from a facial recognition checkout system. The display 556 may include a user display 558 depicting the facial data captured in order to perform facial recognition on the customer. The display 556 may also include a receipt 572 identifying the items purchased, their associated cost, taxes and a total. The display

556 may also include a display, real or computer-generated, of the goods being purchased 574. The display may also incorporate a confirmation portion 575 indicating that facial recognition was successful, a payment identifier 576 indicating the payment that was used, an indication regarding a loyalty program 577, and a confirmation 578 that the process was successful.

FIG. 5 is only shown as an example of facial recognition at a checkout in a store scenario. Other systems may also incorporate the facial recognition processes and systems shown herein.

Figure 6:
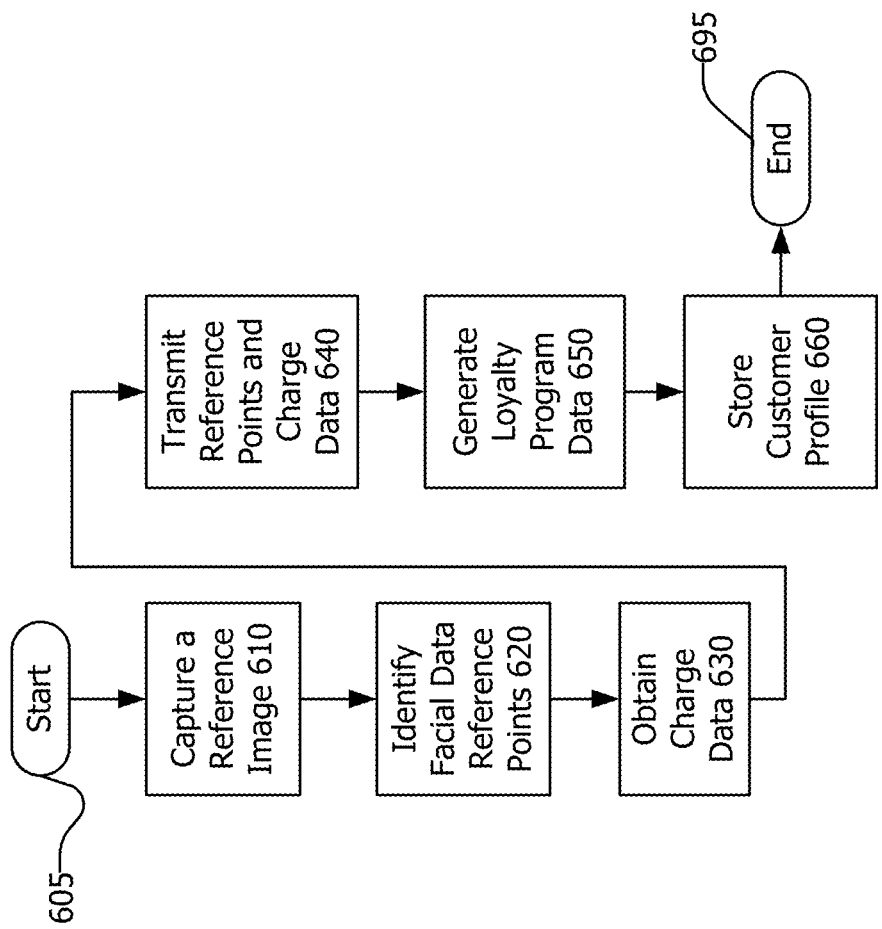
FIG. 6 is flowchart of the check-in process.

FIG. 6 is flowchart of the check-in process. The process begins at start 605 and continues to end 695. However, the process may not all take place in a short time frame and many instances of the process may be taking place simultaneously for different individuals. The process or a part of the process may iterate many times.

After the start 605, the process begins by capturing a reference image at 610. The individual may be guided during the capture of this image so that the resulting reference map, made up of a plurality of reference points, may be of high quality for performing later facial recognition. This process may take place, for example, using the check-in station 210 (FIG. 2).

After the image is captured, the facial data reference points are identified at 620. This process may take place using the face image processing server 230 (FIG. 2). For example, image data may be transmitted to the face image processing server 230 which may use face registration software 232 to generate a reference map. The reference map may be stored locally or may be provided back to the check-in station 210 for confirmation prior to storage. In other implementations, the check-in station 210 may generate the reference map without communication with any external server.

As a next step, the check-in station 210 (FIG. 2) may be used to obtain charge data at 630. This may include the individual providing a credit card or associating a credit card with the account being created as a part of this process.

Next, that reference map (made up of a series of reference points) and charge data 640 may be transmitted to the face image processing server 230 and/or customer database 240 (FIG. 2) for storage at 640. In some cases, this data may be stored together, but in others it may intentionally separated. Regardless, facial recognition data and charge data may be joined, logically, through the use of a single customer identification number.

The customer database 240 or other system may generate loyalty program data for association with the individual in the customer database 240 at 650.

Next, the customer profile is stored at 660. This may include storage of the reference map within the facial database 238 while the customer charge and loyalty program data may be stored in the database storage 242 of the customer database 240 (FIG. 2).

Figure 7:
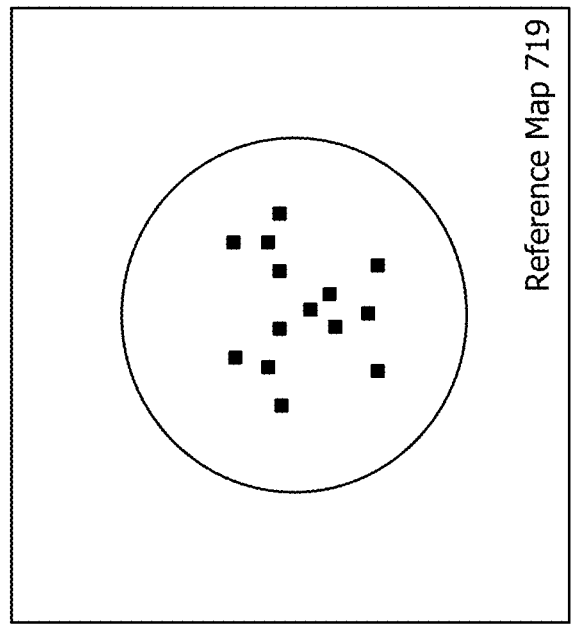
FIG. 7 is a visual example of a facial map generation during the check-in process.
Figure 7:
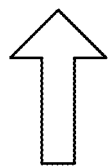
Figure 7:
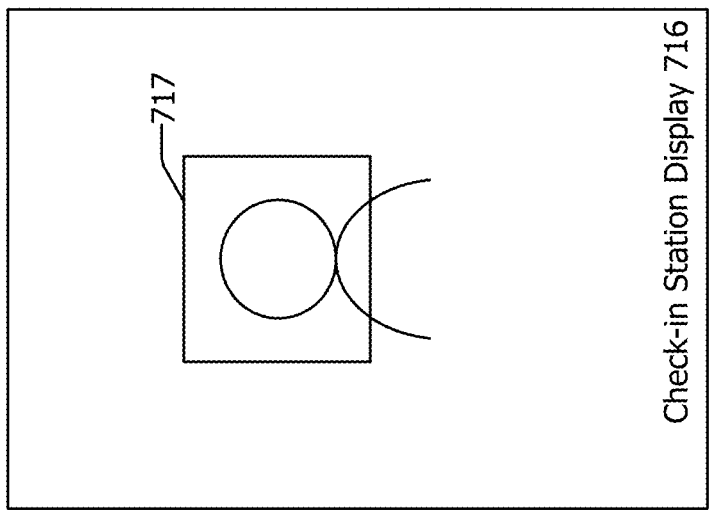

FIG. 7 is a visual example of a facial map generation during the check-in process. In the visual example, the check-in station display 716 may display an image of the user and may provide visual feedback indicating the capture area 717 that is being highlighted as a face for use in generating a reference map.

After the image is captured, the reference map 719 may be generated, either locally by the check-in station 210 or by the face image processing server 230.

Figure 8:
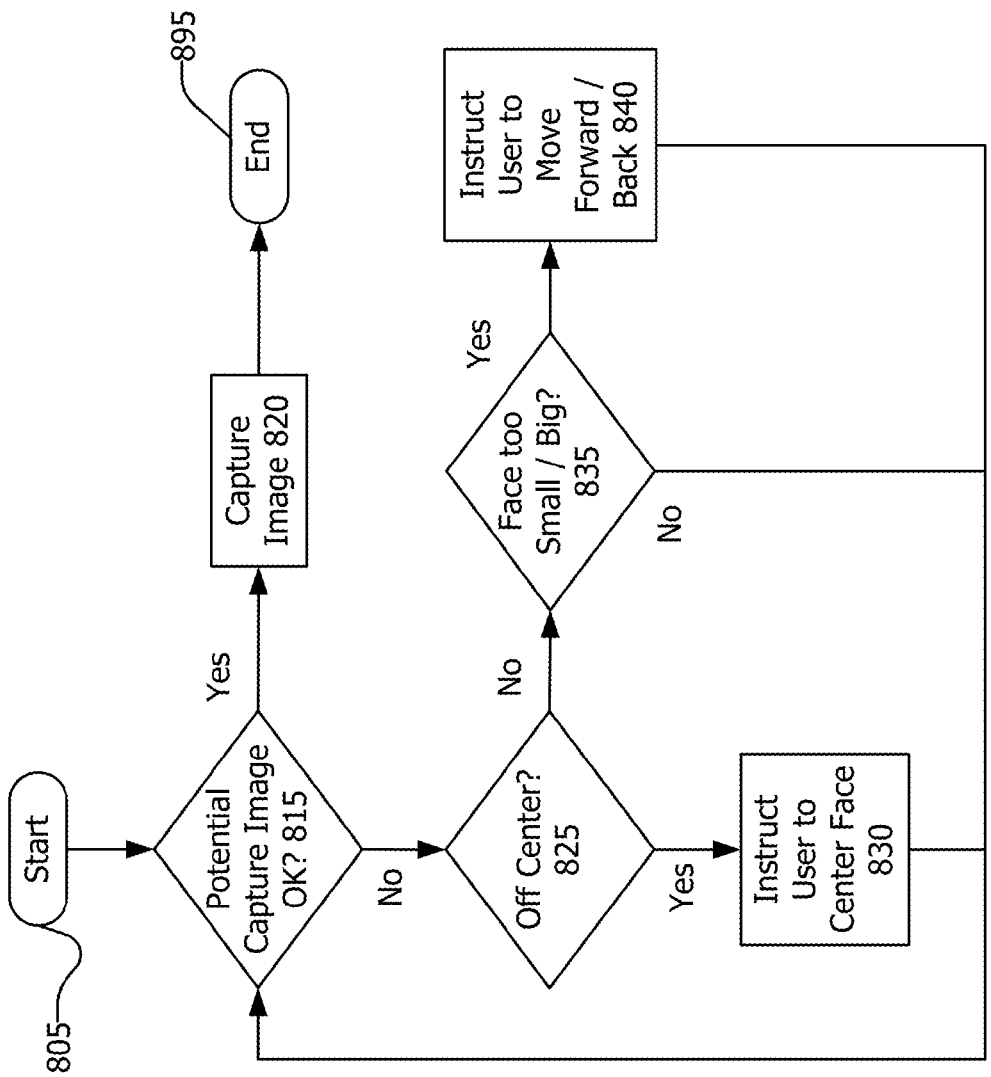
FIG. 8 is a flowchart for providing real-time feedback during a checkout process.

FIG. 8 is a flowchart for providing real-time feedback during a checkout process. The process begins at start 805 and continues to end 895. However, the process may not all take place in a short time frame and many instances of the process may be taking place simultaneously for different individuals. The process or a part of the process may iterate many times.

The process of FIG. 8 may take place, for example, as a user is attempting to checkout at a store or as a user is attempting to authenticate using facial recognition. After the start 805, the process begins with a determination whether the potential capture image is acceptable at 815. If so (yes at 815), positive feedback may be provided and the image is captured at 820 and used for generating a reference map for comparison with a stored reference map in order to perform facial recognition. The process then ends at 895.

Figure 9:
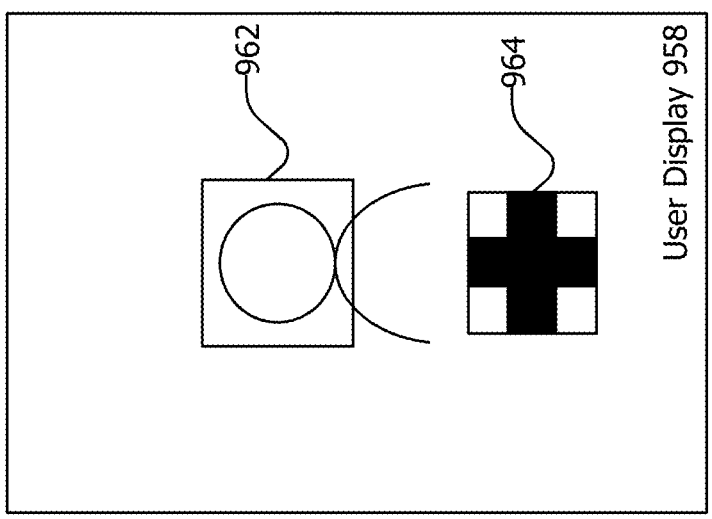
FIG. 9 is a series of user displays showing real-time feedback during a checkout process.
Figure 9:
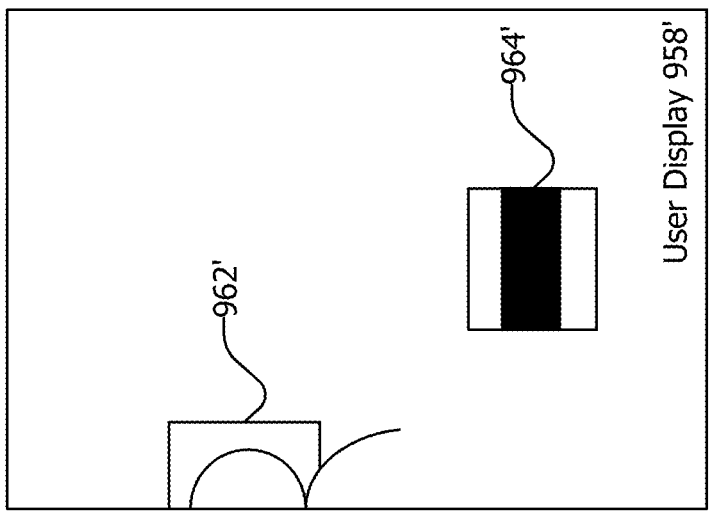
Figure 9:
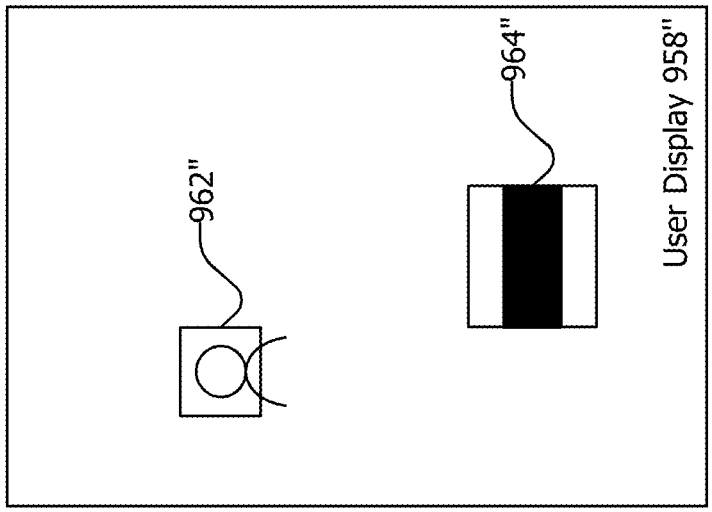

FIG. 9 shows a series of user displays showing real-time feedback during a checkout process. An example of an acceptable potential capture image is shown in FIG. 9. The head of the individual is centered within the frame of the example user display 958. This is shown with the capture area 962 highlighted. Positive feedback 964 may also be provided to indicate that the potential capture image is acceptable. Though a large "plus" sign is shown in user display 958, the feedback may merely be a green light, a text-based indication stating that the capture image is acceptable, or green outlining of the capture area 962.

Returning to FIG. 8, if the potential capture image is not acceptable (no at 815), then a determination is made whether the image is off center at 825. An off center image is one that is partially obscured by either being out of frame or having one or more objects obstructing the face. This may be determined, for example, by finding only a subset of the required reference points in an object identified as a face.

For example, as shown in the user display 958' of FIG. 9, if a face is too far to the left of the camera, only one eye and part of a nose and mouth will be visible. The resulting reference map will be incomplete and facial recognition will not be successful. Thus, if the face is off center at 825, the user may be instructed to center their face at 830. This instruction may take many forms, but as shown in FIG. 9, the instruction may be coupled with an on-screen indication that the face is off-center. Capture area 962' may appear in a color, such as red, orange or yellow, indicating that the system has recognized a face, but that the face is not acceptable for performing facial recognition. Similarly, other visual indicia may also be provided such as negative feedback 964'. Textual instruction may request that a user move his or her face to the center of the camera field of view or focal point.

Returning to FIG. 8, if the image is not off center (no at 825), then a determination is made whether the face is too big or two small at 835. This determination may be made based upon an inability to generate quality reference points for use in a reference map because the potential reference points are too close together or too far apart.

For example, in user display 958" of FIG. 9, the capture area 962 is too small a portion of the overall user display 958" to be used to generate reference points. Likewise, were the capture area too big, the resulting reference map may be inadequate for comparison with stored reference maps.

When this is the case, the user may be instructed to move forward or back at 840 (FIG. 8) depending on the relevant situation. Simultaneously, the system may provide negative feedback 964" indicating that the capture area 962 is not acceptable. In addition or alternatively, the capture area 962" may be colored yellow, for example, to indicate that a face has been detected, but that it is too small or too large to function for facial recognition.

Following any of steps 830, a "no" at 835, or 840; the potential capture image may be re-scanned to determine if it is acceptable at 815. If so, the image is captured at 820, as described above, and the process ends at 895. In this way, real-time feedback may be provided to a customer or potential user of the facial recognition system in order to ensure that a suitable image is used for the comparison with the stored reference map in order to perform facial recognition thereon.

Figure 10:
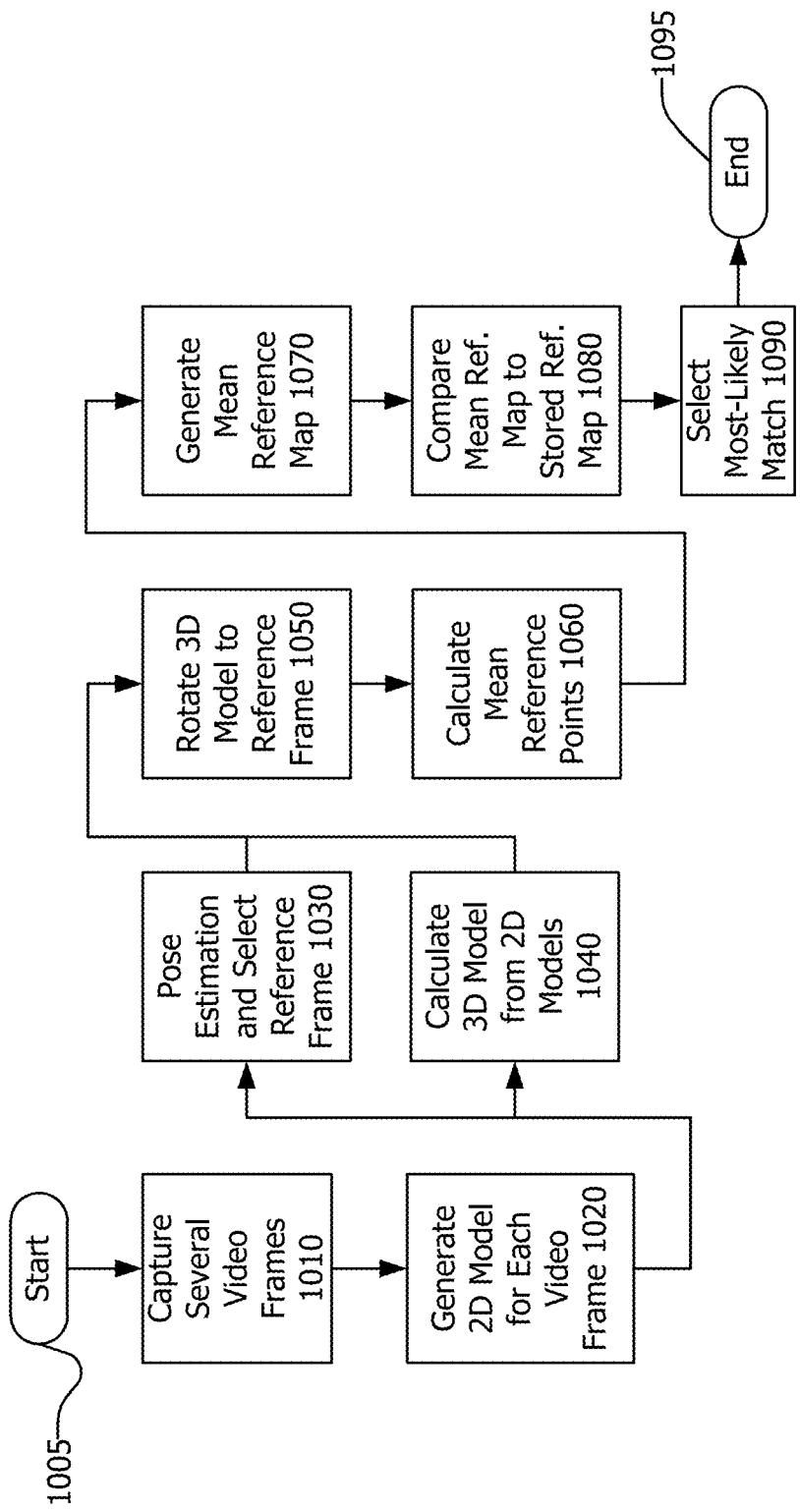
FIG. 10 is a flowchart for facial recognition using a mean reference map.

FIG. 10 is a flowchart for facial recognition using a mean reference map. The process begins at start 1005 and continues to end 1095. However, the process may not all take place in a short time frame and many instances of the process may be taking place simultaneously for different individuals. The process or a part of the process may iterate many times.

After the start 1005, a camera, such as camera 155, captures several video frames at 1010. These video frames may be, for example, a consecutive series of still images drawn from video in the form of a video file or a video stream of an individual.

After several video frames are captured at 1010, two-dimensional models (i.e., the coordinates of the reference points) are generated for each video frame at 1020. With the reference points detected in one frame, the pose variations of that frame in the format of yaw, pitch, and roll angle rotations can be estimated through, for example, the Active Appearance Model (AAM), which is publicly available as a software development kit (SDK). The frame candidate with the least pose variations to the front-view of face may be selected as the reference frame at 1030. The reference frame is likely the best candidate for rotating a 3D model of the face to frontal view at 1050.

Using at least two of the video frames, a three-dimensional model may be created by capturing the reference points on each model. At least two frames of video are needed to create a unique three-dimensional model. With only slight variations in pose, the system can extrapolate the three-dimensional layout of an individual's face at 1040. The reference points detected in one video frame are used as the initial locations for searching in the next frame, resulting in more stable point correspondences. After computing the reference point locations and correspondences, the estimated rotations may be generated to thereby create a stable 3D shape model, utilizing the orthographic projection. This extrapolation is facilitated because the captured video frames are consecutive and large movements of a face are unlikely. To improve the accuracy of the three-dimensional model, more frames, such as five frames, of video may be used. Alternatively, several frames of video may be used to create several independent three-dimensional models that may then be averaged or otherwise compared.

The three-dimensional facial models may be created as a series of x, y, z coordinates for each three-dimensional reference point. As such, each three-dimensional model may be stored as a matrix $F_{3D}$ in the form $F_{3D}=[x_{00} \ldots x_n, y_{00} \ldots y_n, z_{00} \ldots z_n]$, where $x_n$ is an x coordinate value of the nth point, $y_n$ is a y coordinate value of the nth point, and $z_n$ is a z coordinate value of the nth point.

After several two-dimensional models $F_{2D}$ are captured at 1020, one for each frame of video, each of the two-dimensional models may be combined so as to generate a three-dimensional model in the form $F_{3D}$ at 1040. This process is intentional to offset any potential non-matches that may result from comparing a non-front facing two-dimensional model with a reference map drawn from a video frame. These non-front facing images can result in faces that do not appear to be correct, but actually are the individual for whom facial recognition is requested.

Because the model $F_{3D}$ can be represented by a matrix of reference points, matrix multiplication may be used, then, to easily combine and rotate a series of two-dimensional models to a front facing position in three dimensions because $F_{2D}=M*F_{3D}$ where M is a projecting matrix M defined as $M=[1\ 0\ 0,\ 0\ 1\ 0]*R_{Rotation}$ where $R_{Rotation}=[\cos\alpha\cos\beta\cos\alpha\sin\beta\sin\gamma\sin\alpha\cos\gamma\cos\alpha\sin\beta\cos\gamma+\sin\alpha\sin\gamma,\sin\alpha\cos\beta\sin\alpha\sin\beta\sin\gamma+\cos\alpha\cos\gamma\sin\alpha\sin\beta\cos\gamma-\cos\alpha\sin\gamma,\cos\beta\sin\gamma\cos\beta\cos\gamma]$ where $\alpha$ is yaw, $\beta$ is pitch, and y is roll, times a matrix of t two-dimensional reference points.

We use orthographic projection to reconstruct a three-dimensional face model from a series of two-dimensional face models at 1040. The three-dimensional model of the face $F_{3D}=M^{-1}*F_{2D}$. $F_{2D}$ takes the form $[x_{00}^1 \ldots x_n^1 \ldots x_{00}^t \ldots x_n^t, y_{00}^1 \ldots y_n^1 \ldots y_{00}^t \ldots y_n^t]$ and $M^{-1}$ is $[R_{11}^1 R_{12}^1, R_{13}^1 \ldots R_{11}^t R_{12}^t R_{13}^t, R_{21}^1 R_{22}^1 R_{23}^1 \ldots R_{21}^t R_{22}^t R_{23}^t]$ where t is the time of each frame, n is the number of reference points used, and where $R_{ij}$ is the entry of the rotation matrix $R_{Rotation}$ of the the frame of series of video frames. This generalized format uses t frames of video. In practice, the system has been using five frames of video because it provides sufficient data to provide an accurate mean reference map. Once the three-dimensional face model is obtained at 1040, the system is capable of rectifying the two-dimensional model of each frame in the series of captured video frames.

Since a front-face position is necessary for compression to a reference frame, the obtained three-dimensional face model may be rotated to match the orientation of the selected reference frame (typically, front-facing). The estimation of pose variation of each frame is provided by a software development kit (SDK) and the frame with the least pose variations to front-view of face is selected as the reference frame at 1030. The selection of reference frame may be calculated as $F_i=\min_i\{i=1,n\}$ $(\sqrt{\alpha_i^2+\beta_i^2+\gamma_i^2})$, where $F_i$ is the resulting index of the selected reference frame, n is the name of frames in the series, $\alpha_i$ is yaw, $\beta_i$ is pitch, and $\gamma_i$ is roll angles of the i-th frame. Once the reference frame is selected, the rotation can be calculated as a projecting matrix $M=[1\ 0\ 0,\ 0\ 1\ 0]*R_{Rotation}$ where $R_{Rotation}=[\cos\alpha\cos\beta\cos\alpha\sin\beta\sin\gamma-\sin\alpha\cos\gamma\cos\alpha\sin\beta\cos\gamma+\sin\alpha\sin\gamma,\sin\alpha\cos\beta\sin\alpha\sin\beta\sin\gamma+\cos\alpha\cos\gamma\sin\alpha\sin\beta\cos\gamma-\cos\alpha\sin\gamma,-\sin\beta\cos\beta\sin\gamma\cos\beta\cos\gamma\ ]$ where $\alpha$ is yaw, $\beta$ is pitch, and y is roll angles of the selected reference frame.

After $F_{3D}$ is constructed at 1040,d the rotation matrix of reference frame may be calculated at 1050 and the mean two-dimensional model $F_{2D}$ may be created by multiplying the projecting matrix M times t e F3D matrix at 1060.

The mean two-dimensional model $F_{2D}$ matrix is a two-dimensional matrix $F_{2D}$ that is an average (mean) of the rotated to front three-dimensional matrix $F_{3D}$. This obtained $F_{2D}$ represents a series of average (mean) coordinates of front-face positions, which may be called named as mean reference points (or mean landmarks). These image features are associated with each mean reference point on the reference frame image. These mean reference points make up a mean reference map at 1070.

As used herein the mean reference map means a reference map generated as a result of more than one reference map such that each reference point of that reference map are each averages of more than one reference point appearing in more than one reference map. By generating a mean reference map at 1070, imperfections in image capture and in reference point generation can be compensated for by performing the same reference point identification processes repeatedly for a single face rather than by repeating the process as a whole possibly identifying multiple potential individuals. The process also helps to filter out frames with large pose variations, unusual lighting, or other inconsistencies by lowering their impact on the overall mean reference map.

The mean reference map may then be compared with the stored reference maps at 1080 to more accurately perform facial recognition. The most likely match to the mean reference map, if the match is within a specified similarity threshold, is then selected at 1090 as the most likely recognized face. In practice, this technique greatly improves accuracy over methods not employing a mean reference map for comparison.

In tests, using the process described above in conjunction with other accuracy processes increases accuracy to 99% over 94% accuracy when using a single frame of video with a front facing individual. The processing time required is longer, given that multiple video frames are being evaluated, but the typical single video frame time is on the order of 300 milliseconds, while the multiframe processing time is on the order of 500-1200 milliseconds. Though this takes longer, the increase in accuracy is likely of sufficient value to merit the longer processing time. During a typical checkout process or authentication process, an additional half to full second are likely not much of a problem. Further, the application of additional processing power will lower these processing times.

Figure 11:
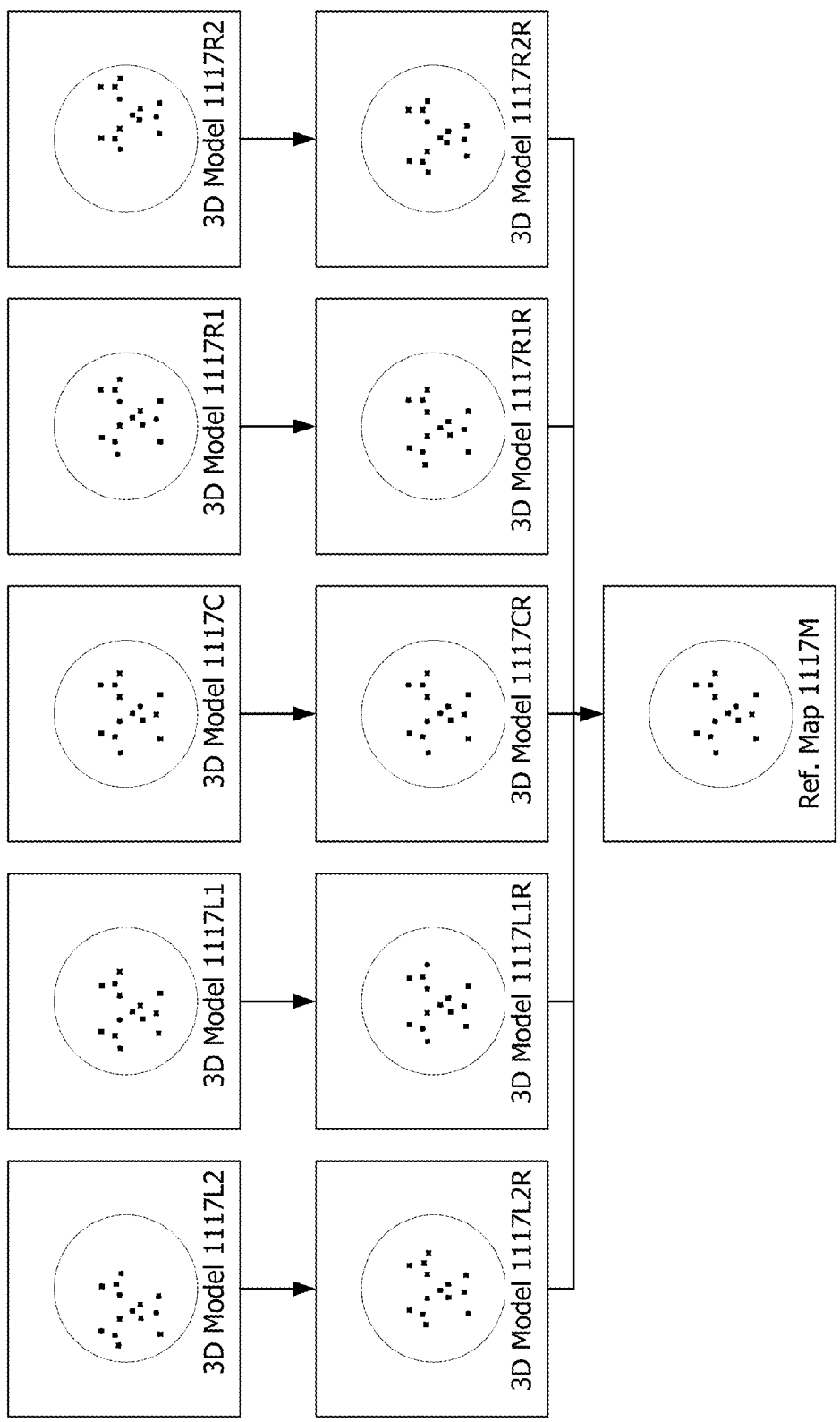
FIG. 11 is a visual example of facial map capture, rotation, and averaging.

FIG. 11 is a visual example of facial map capture, rotation, and averaging. By way of an example, FIG. 11 is shown as a visual representation of the processes described in FIG. 10. A series of facial poses are shown as 3d Models 1117L2, 1117L1, 1117C, 1117R1 and 1117R2. Each of these faces is posed slightly off from a more leftward-facing to a center-facing and to a more rightward-facing. The process described in FIG. 10 has the overall effect of mathematically "rotating" the faces to middle, as shown in 3D models 1117L2R, 1117L1R, 1117CR, 1117R1R, and 1117R2R. The resulting images are then averaged in order to generate the mean reference map 1117M.

Because matrix multiplication operates efficiently in three dimensions, in reality, a series of two-dimensional models are used to simultaneously create a single three-dimensional model. As an added benefit, the resulting three-dimensional model will automatically be an average of the series of two-dimensional models. The three dimensional model may then be rotated to front and "flattened" to a single two-dimensional model to create the mean reference map 1117M. Though this visual representation is helpful for grasping the concept, the process of averaging and generating the three-dimensional model may occur simultaneously, rather than sequentially as shown. However, in different systems, the same process may be accomplished by first creating several three-dimensional models, rotating each of them to a front-facing position, then averaging the resulting reference maps to create a mean reference map. This is merely another option by which to accomplish the same overall process.

Figure 12:
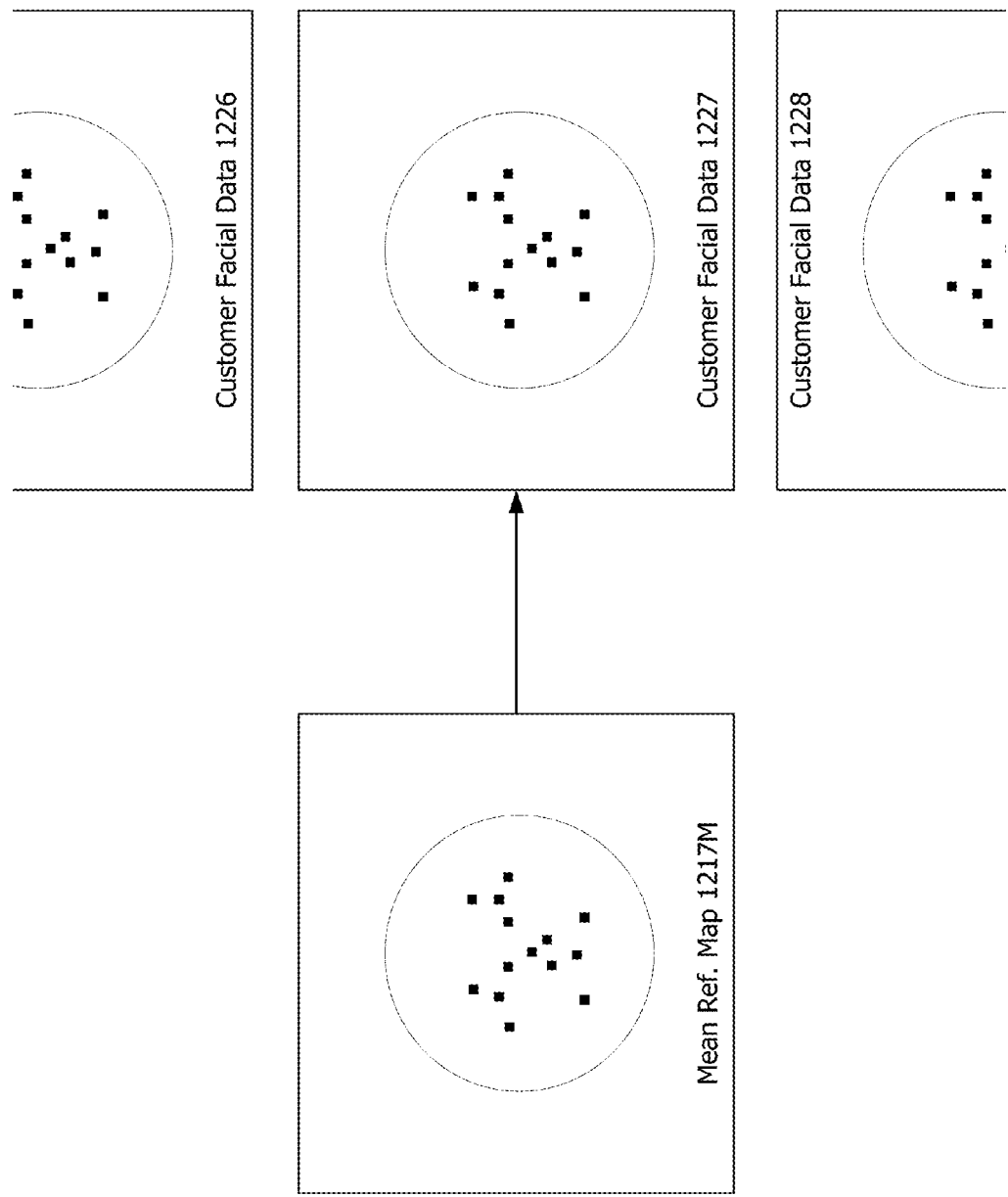
FIG. 12 is visual example of matching a mean reference map.

FIG. 12 is visual example of matching a mean reference map. This takes place when the mean reference map is compared at 1160 (FIG. 11) to a series of stored reference frames. FIG. 12 is a visualized example of the comparison that takes place. The comparison of the mean reference map 1217M to customer facial data 1226, 1227 and 1228 may take place so as to identify a stored reference map that is most similar to the mean reference map 1217M. Thereafter, the customer associated with that customer facial data 1227 may be identified as the most likely match, assuming a similarity threshold has been met.

Figure 13:
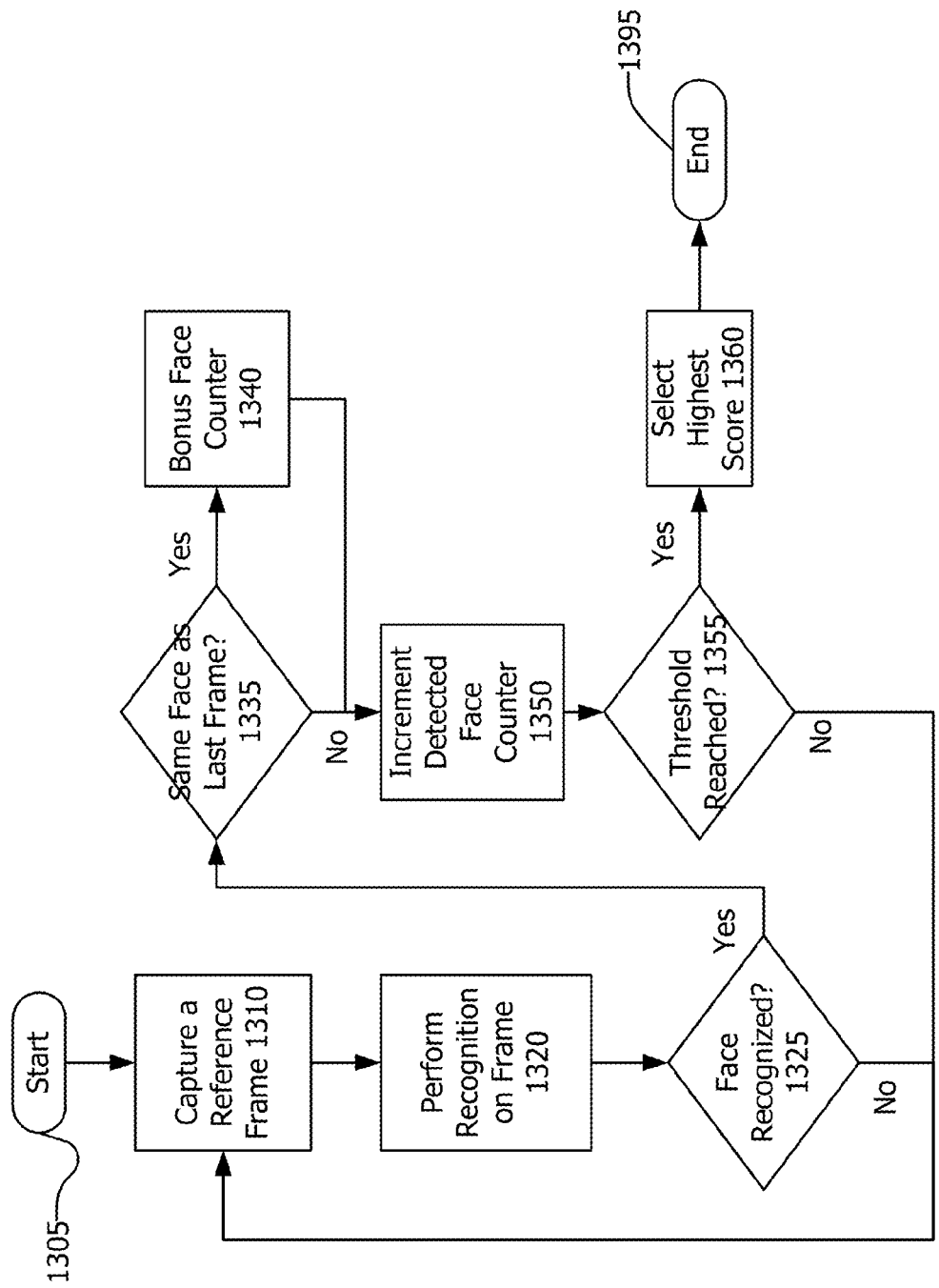
FIG. 13 is a flowchart of facial recognition using cumulative scoring.

FIG. 13 is a flowchart of facial recognition using cumulative scoring. The process begins at start 1305 and continues to end 1395. However, the process may not all take place in a short time frame and many instances of the process may be taking place simultaneously for different individuals. The process or a part of the process may iterate many times.

After the process begins at 1305, a reference frame is captured at 1310. This reference frame may be, for example, a single frame of video from a video data stream. Alternatively, this reference frame may be a mean reference frame developed using the process described with respect to FIG. 10 above. Once captured or developed, facial recognition may be performed on the frame at 1320. Standing alone, this single frame of facial recognition is insufficient to end the overall facial recognition process. Instead a histogram of sorts may be generated with cumulative confidence scores determining whether an individual is properly identified by the facial recognition system.

Next, a determination is made whether the face is recognized at 1325. If not (no at 1325), then facial recognition is non-responsive and another reference frame is captured at 1310. If so (yes at 1325), then a determination is made whether the face detected is the same face that was detected in the last frame at 1335. The first reference frame can never be the same as the last frame detected because there is no proceeding frame. But, subsequent frames may satisfy this requirement.

If the face is recognized (yes at 1335) as matching a stored reference frame, then a bonus is added to a confidence score for a given individual at 1340. If not (no at 1335), then confidence score for an individual is incremented without any bonus. In some cases, the confidence score of the previously-detected face may also be decremented slightly for not matching the most recent frame. The bonus at 1340 is intended to add to the confidence score because when multiple, consecutive frames are identified as the same face, it is increasingly likely that the face shown is that of the person identified.

Next, a determination is made whether a threshold confidence score has been reached at 1355. If not (no at 1355), then another reference frame is captured at 1310 and the process continues. If so (yes at 1355), then the individual associated with the face that met the threshold (and thus had the highest score) is selected as the individual identified by the facial recognition system at 1360 and the process ends at 1395.

Figure 14:
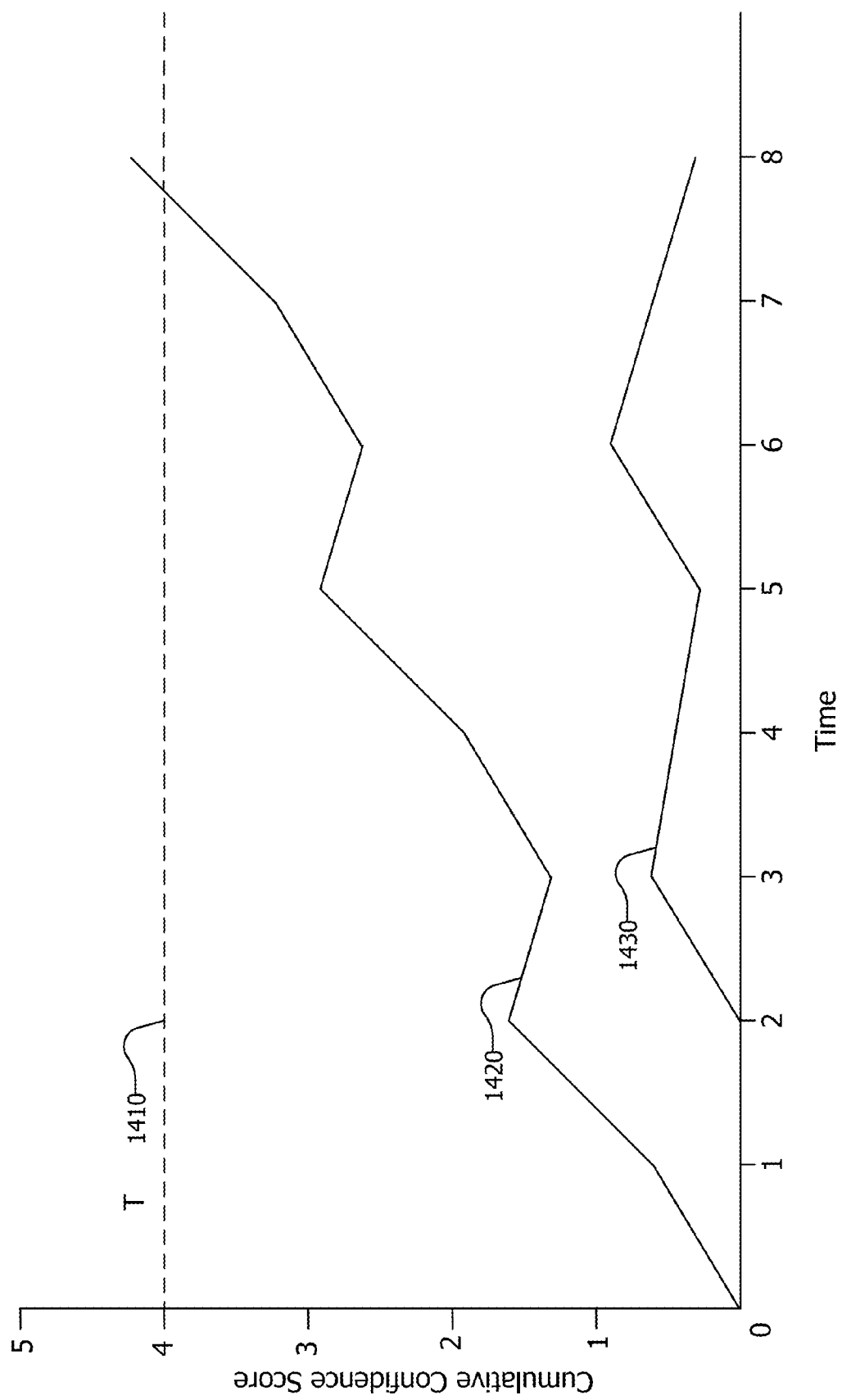
FIG. 14 is a graph showing an example facial recognition using cumulative scoring.

FIG. 14 is a graph showing an example facial recognition using cumulative scoring as discussed with reference to FIG. 13. In the first reference frame, the confidence score 1420 goes up without a bonus because there was no previous frame at all. In the second frame, the confidence score 1420 goes up with a bonus (by a larger amount) because it was the same face as the prior face.

In the third frame, a second face is detected with its own confidence score 1430. As a result, the confidence score 1420 of the first face goes down slightly as a penalty. In the fourth frame, the confidence score 1420 of the first face goes up by a non-bonus amount because it was not the last identified face. The confidence score 1430 of the second face goes down in the fourth and fifth frame as it decays. Simultaneously, the confidence score 1420 of the first face goes up by a normal amount, then a bonus amount, nearly to the threshold 1410.

In frame five, the confidence score 1430 of the second face goes up while in frames six and seven the confidence score 1430 goes down. Opposite that, the confidence score 1420 of the first face goes down in frame five, then up in frames six and seven. At frame seven, the confidence score 1420 of the first face has crossed the threshold 1410 and is selected as the highest score 1360 (FIG. 13).

For purposes of simplicity, this example is shown only involving two confidence scores 1420, 1430. However, any number of confidence scores associated with any number of individuals may be incorporated. The resulting race to the threshold helps quickly identify the correct individual without reliance upon a single frame of captured video. Nonetheless, if the confidence is high and the individual's face is repeatedly identified, the individual will be identified quickly. If there is some question, the facial recognition process may take more time.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A facial recognition system comprising:
   a station including at least one video camera for capturing a series of video frames of an individual face; and
   a face image processing server for
      generating a series of two-dimensional models of the individual face at various angles, each model based upon one of the series of video frames,
      combining the series of two-dimensional models of the individual face with a projecting matrix to create a three-dimensional model of the individual face, wherein the three-dimensional model is a matrix $F_{3D}=[x_{00} \ldots x_n, y_{00} \ldots y_n, z_{00} \ldots z_n]$, where $x_n$ is an x coordinate value of an nth reference point, where n is a number of facial reference points in each video frame and an integer greater than one $y_n$ is a y coordinate value of the nth reference point, and $z_n$ is a z coordinate value of the nth reference point and wherein the three-dimensional model is generated by multiplying the inverse of a projecting matrix M defined as $M=[1\ 0\ 0,\ 0\ 1\ 0]*R_{Rotation}$ where $R_{Rotation}=[\cos\alpha\cos\beta\ \cos\alpha\sin\beta\sin\gamma-\sin\alpha\cos\gamma\ \cos\alpha\sin\beta\cos\gamma+\sin\alpha\sin\gamma,\ \sin\alpha\cos\beta\ \sin\alpha\sin\beta\sin\gamma+\cos\alpha\cos\gamma\ \sin\alpha\sin\beta\cos\gamma-\cos\alpha\sin\gamma,\ -\sin\beta\ \cos\beta\sin\gamma\ \cos\beta\cos\gamma\ ]$ where $\alpha$ is yaw, $\beta$ is pitch, and $\gamma$ is roll, times a matrix of two-dimensional coordinates of n facial reference points $F_{2D}$ in the form $[x_{00}^1 \ldots x_n^1 \ldots x_{00}^t \ldots x_n^t, y_{00}^1 \ldots y_n^1 \ldots y_{00}^t \ldots y_n^t]$ and where $M^{-1}$ is $[R_{11}^1\ R_{12}^1,\ R_{13}^1 \ldots R_{11}^t\ R_{12}^t\ R_{13}^t,\ R_{21}^1\ R_{22}^1\ R_{23}^1 \ldots R_{21}^t\ R_{22}^t\ R_{23}^t]$ where t is a number of series of video frames and where $R_{ij}^t$ is an entry of the rotation matrix $R_{Rotation}$ of the t-th frame of series of video frames;
      rotating the three-dimensional model to a reference frame that corresponds to a frontal view of the individual face,
      generating a two-dimensional mean reference map by projecting from the rotated three-dimensional model, the mean reference map made up of the series of n facial reference points,
      accessing a facial database to compare the mean reference map to a series of previously-stored reference maps, each of the previously-stored reference maps including a set of previously-stored reference points, and
      identifying as a match an individual whose previously-stored reference map most closely matches the mean reference map.

2. The system of claim 1 further comprising a display for displaying captured video frames to the individual.

3. The system of claim 2, wherein the display is further for providing feedback to the individual such that when the individual face in a captured video frame is too distant from the camera to serve as a reference frame, generating a visual indication on the display requesting that the individual move closer to the camera.

4. The system of claim 2, wherein the display is further for providing feedback to the individual such that when the individual face in a captured video frame is partially-obscured as partially out-of-frame, generating a visual indication on the display requesting that the individual move closer to a center of a focal point of the camera.

5. The system of claim 1 wherein the face image processing server is further for:
   incrementing a confidence score for the individual identified as the match;
   repeating the identification process until the confidence score for the individual exceeds a confidence threshold; and
   identifying the individual whose confidence score exceeded the confidence threshold.

6. A method of performing facial recognition comprising:
   capturing a series of video frames of an individual face using a camera;
   generating a series of two-dimensional models of the individual face at various angles, each model based upon one of the series of video frames;
   combining the series of two-dimensional models of the individual face with a projecting matrix to create a three-dimensional model of the individual face, wherein the three-dimensional model is a matrix $F_{3D}=[x_{00} \ldots x_n, y_{00} \ldots y_n, z_{00} \ldots z_n]$, where $x_n$ is an x coordinate value of an nth reference point, where n is a number of facial reference points in each video frame and an integer greater than one $y_n$ is a y coordinate value of the nth reference point, and $z_n$ is a z coordinate value of the nth reference point and wherein the three-dimensional model is generated by multiplying the inverse of a projecting matrix M defined as M=[1 0 0, 0 1 0]*$R_{Rotation}$ where $R_{Rotation}$=[cos α cos β cos α sin β sin γ−sin α cos γ cos α sin β cos γ+sin α sin γ, sin α cos β sin α sin β sin γ+cos α cos γ sin α sin β cos γ−cos α sin γ, −sin β cos β sin γ cos β cos γ] where α is yaw, β is pitch, and γ is roll, times a matrix of two-dimensional coordinates of n facial reference points $F_{2D}$ in the form $[x_{00}^1 \ldots x_n^1 \ldots x_{00}^t \ldots x_n^t, y_{00}^1 \ldots y_n^1 \ldots y_{00}^t \ldots y_n^t]$ and where $M^{-1}$ is $[R_{11}^1 R_{12}^1, R_{13}^1 \ldots R_{11}^t R_{12}^t R_{13}^t, R_{21}^1 R_{22}^1 R_{23}^1 \ldots R_{21}^t R_{22}^t R_{23}^t]$ where t is a number of series of video frames and where $R_{ij}^t$ is an entry of the rotation matrix $R_{Rotation}$ of the t-th frame of series of video frames;

rotating the three-dimensional model to a reference frame that corresponds to a frontal view of the individual face;

generating a two-dimensional mean reference map by projecting from the rotated three-dimensional model, the mean reference map made up of the series of n facial reference points;

accessing a facial database to compare the mean reference map to a series of previously-stored reference maps each of the previously-stored reference maps including a set of previously-stored reference points; and identifying as a match, an individual whose previously-stored reference map most closely matches the mean reference map.

7. The method of claim 6 further comprising displaying captured video frames to the individual on a display.

8. The method of claim 7 further comprising providing feedback to the individual on the display such that when the individual face in a captured video frame is too distant from the camera to serve as a reference frame, generating a visual indication on the display requesting that the individual move closer to the camera.

9. The method of claim 8, further comprising providing feedback to the individual on the display such that when the individual face in a captured video frame is partially-obscured as partially out-of-frame, generating a visual indication on the display requesting that the individual move closer to a center of a focal point of the camera.

10. The method of claim 6 further comprising:

incrementing a confidence score for the individual identified as the match;

repeating the identification process until the confidence score for the individual exceeds a confidence threshold; and identifying the individual whose confidence score exceeded the confidence threshold.

\* \* \* \* \*